(12) United States Patent
Houssein et al.

(10) Patent No.: US 6,418,479 B1
(45) Date of Patent: Jul. 9, 2002

(54) I/O PASS THROUGH FOR A DISTRIBUTED COMPUTER SYSTEM

(75) Inventors: Ahmet D. Houssein, Beaverton; Paul A. Grun, Tigard; William T. Futral, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/139,021

(22) Filed: Aug. 24, 1998

Related U.S. Application Data

(60) Provisional application No. 60/057,221, filed on Aug. 29, 1997.

(51) Int. Cl.$^7$ ................................................ G06F 13/00
(52) U.S. Cl. ........................ 709/245; 709/236; 709/250; 709/321
(58) Field of Search ................................. 709/212, 217, 709/236, 237, 245, 246, 250, 321, 324; 710/8, 12, 64, 65, 72, 101

(56) References Cited

U.S. PATENT DOCUMENTS

| | | | |
|---|---|---|---|
| 5,592,622 A | * | 1/1997 | Isfeld et al. ................ 709/207 |
| 5,632,016 A | * | 5/1997 | Hoch et al. ................. 709/218 |
| 5,953,511 A | * | 9/1999 | Sescila, III et al. ......... 710/129 |
| 6,170,025 B1 | * | 1/2001 | Drottar et al. ................ 710/48 |

* cited by examiner

*Primary Examiner*—Viet D. Vu
(74) *Attorney, Agent, or Firm*—Antonelli, Terry, Stout & Kraus, LLP

(57) ABSTRACT

A method is provided for remotely executing a bus transaction. The method includes the steps of detecting a bus transaction on a first bus located at a first node, identifying, based on the memory address of the bus transaction, that the first bus transaction is directed to a second node that is remotely located from the first node. The method also includes the steps of wrapping the first bus transaction in a packet for transmission over a network, transmitting the packet over the network to the second node and then unwrapping the first bus transaction from the packet received at the second node. The method further includes the steps of converting the first bus transaction to a second bus transaction that can be executed on a second bus located at the second node and outputting the converted second bus transaction onto the second bus to be executed.

6 Claims, 7 Drawing Sheets

PACKET PAYLOAD 410

I/O PASS THROUGH FOR A DISTRIBUTED COMPUTER SYSTEM

CROSS-REFERENCE TO RELATED APPLICATIONS

This application is based upon U.S. Provisional application Ser. No. 60/057,221 filed on Aug. 29, 1997, entitled "Method and Apparatus For Communicating Between Interconnected Computers, Storage Systems, And Other Input/Output Subsystems," the disclosure of which is incorporated herein by reference, and U.S. Provisional application Ser. No. 60/081,220 filed on Apr. 9, 1998, entitled "Next Generation Input/Output," the disclosure of which is also incorporated herein by reference.

BACKGROUND OF THE INVENTION

The present invention relates generally to computers, and more particularly to communications between interconnected computer nodes, storage subsystems, and other network devices.

Assessments of server and I/O technologies and their respective marketplaces make clear that cluster communications, including server-to-server communications and server-to-I/O communications, will be increasingly based on a distributed model. Existing server architectures, based on a shared-address-space model, bus-oriented connections to I/O devices and I/O transactions based on a load/store memory model, have limitations.

FIG. 1 illustrates the general architectural model for current generation servers, including a CPU/memory complex 110 coupled to an I/O bridge 112. In the current model, I/O devices are connected to the host node (CPU/memory complex 110) via one or more PCI buses and one or more bridges 112. There are limitations on the number of electrical loads which may be placed on the host bus. Moreover, these configurations are also limited by the PCI bus, which imposes limits both on the number of electrical loads it is capable of supporting and the physical distances at which devices can be placed. Referring to FIG. 1, storage connectivity and proximity are typically restricted to what fits within a single enclosure.

An architecture for I/O pass-through of the present invention overcomes some of the disadvantages and limitations of prior art computer systems by increasing the number of I/O devices that can be connected to a computer system, by increasing the distance at which the I/O devices are located, and by permitting a more distributed architecture.

SUMMARY OF THE INVENTION

According to an embodiment of the present invention, a method is provided for remotely executing a bus transaction. The method includes the steps of detecting a bus transaction on a first bus located at a first node, identifying, based on the memory address of the bus transaction, that the first bus transaction is directed to a second node that is remotely located from the first node. The method also includes the steps of wrapping the first bus transaction in a packet for transmission over a network, transmitting the packet over the network to the second node and then unwrapping the first bus transaction from the packet received at the second node. The method further includes the steps of converting the first bus transaction to a second bus transaction that can be executed on a second bus located at the second node and outputting the converted second bus transaction onto the second bus to be executed.

DETAILED DESCRIPTION

Figure 1:
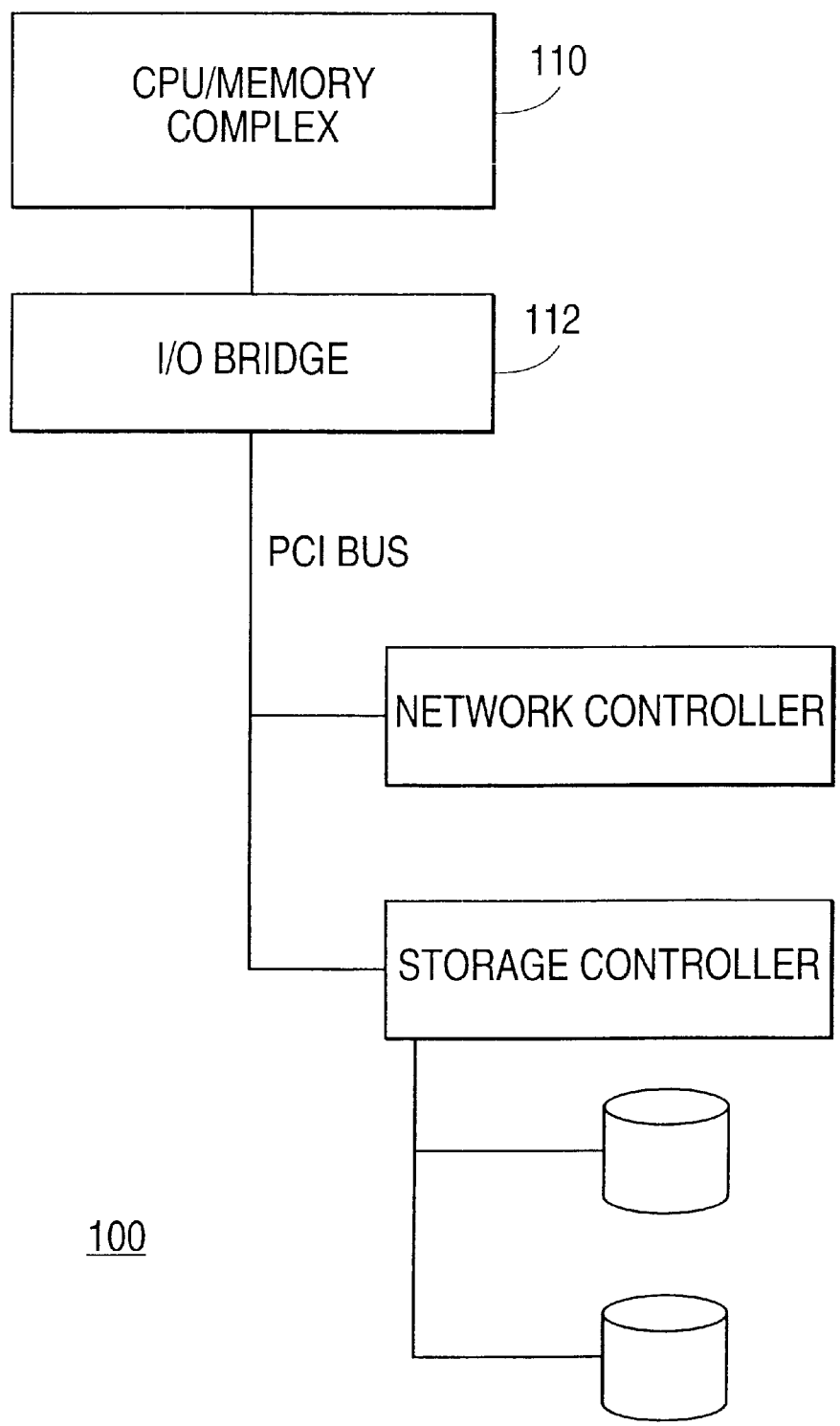
FIG. 1 illustrates a general architectural model for current servers.
Figure 2:
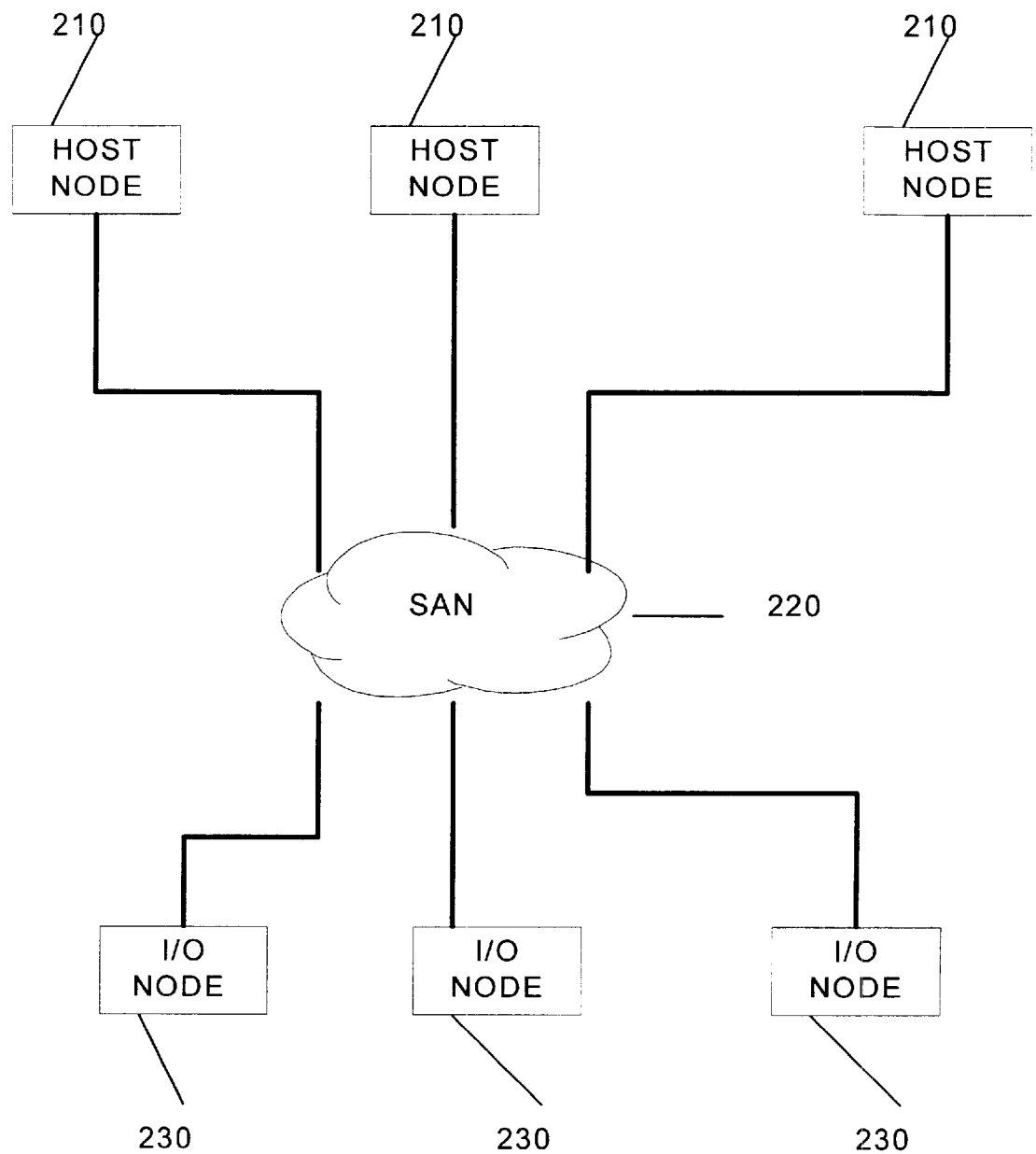
FIG. 2 is a block diagram of an I/O pass-through system according to an embodiment of the present invention.

FIG. 2 is a block diagram of an I/O pass-through system according to an embodiment of the present invention. The I/O pass-through system in FIG. 2 includes a plurality of host nodes 210 and a plurality of I/O nodes 230. Each host node 210 is connected to each I/O node 230 via a network, such as a system area network (SAN) 220. SAN 220 includes links and one or more switches for routing packets between host nodes 210 and I/O nodes 230. Each host node 210 can be any type of computer or computing device, such as a server, a personal computer (PC), a mainframe computer, a workstation, etc. Each I/O node 230 includes one or more I/O devices, such as a SCSI controller or hard disk drive, a tape drive, a Peripheral Component Interconnect (PCI) compatible device, or other I/O device.

In prior art computer systems, I/O devices are typically connected directly to a host central processing unit (CPU) via one or more buses and bus bridge devices. Due to electrical loading limitations, there are limits as to the number of I/O devices and as to the distance at which the I/O devices may be located from the host CPU. However, the architecture of the present invention allows for an increased number of I/O devices in communication with the host CPU and an increase in the distance at which the devices are located from the CPU, thereby permitting a more distributed architecture. Thus, each I/O node 230 can be remotely located from each host node 210.

Figure 3:
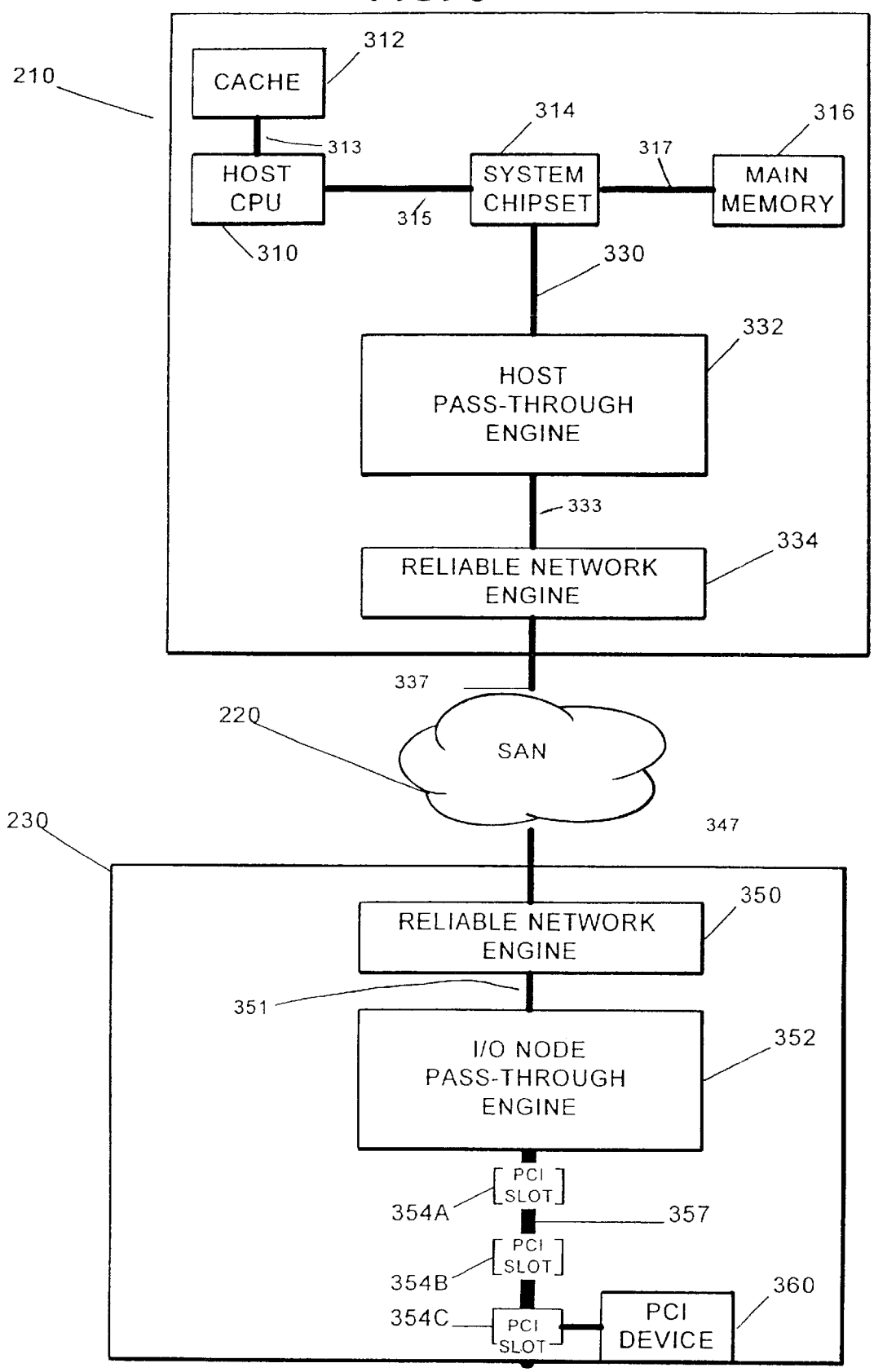
FIG. 3 is a block diagram illustrating further details of the I/O pass-through system illustrated in FIG. 2 according to an embodiment of the present invention.

FIG. 3 is a block diagram illustrating further details of the I/O pass-through architecture illustrated in FIG. 2. Host node 210 is connected to I/O node 230 via SAN 220.

According to an embodiment of the present invention, host node 210 includes a host CPU 310 connected to a local cache memory (cache) 312 via a back side bus 313. Host CPU is connected to a system chipset 314 via front side bus 315. System chipset 314 includes at least a memory and I/O controller (MIOC) for interfacing the host CPU 310, main memory 316 and I/O transactions received via line 330. Main memory 316, which may be dynamic random access memory (DRAM) or the like, is connected to the chipset 314 via line 317. A host pass-through engine (host PT engine) 332 is connected to the chipset 314 via line 330, and a reliable network engine 334 is connected to the host PT engine 332 via line 333.

According to an embodiment of the present invention, I/O node 230 includes a reliable network engine 350 (which is similar to reliable network engine 334 at the host node 210). An I/O node pass-through engine (I/O node PT engine) 352 is connected to reliable network engine 350 via line 351. A Peripheral Component Interconnect (PCI) bus 357 is connected to I/O node PT engine 352. PCI bus 357 includes a plurality of PCI slots 354 connected thereto, each for connecting a PCI compatible device, such as PCI device 360, to PCI bus 357. While FIG. 3 illustrates a PCI bus as bus 357, it should be understood by those skilled in the art that other types of I/O buses and I/O devices can be connected to I/O node PT engine 352, such as an Industry Standard Architecture (ISA) bus, an Extended Industry Architecture (EISA) bus, an Accelerated Graphics Port (AGP) bus, etc.

The reliable network engine 334 of host node 210 can be any type of reliable transport mechanism for wrapping data received from the host PT engine 332 into one or more network packets for reliable transmission over SAN 220. Likewise, reliable network engine 334 also receives and unwraps network packets from SAN 220 and passes the packet payload and other information to the host PT engine 332. Reliable network engine 334 may include software for executing any of several standard reliable network protocols, such as TCP/IP, Fibre Channel, Asynchronous Transfer Mode (ATM, etc., which allow packets to be reliably sent over SAN 220.

Likewise, reliable network engine 350 (in the I/O node 230) can be the same or similar software for providing a reliable transport mechanism (e.g., TCP/IP, Fibre Channel, ATM) for wrapping data received from the I/O node PT engine 352 into a network packet for transmission over SAN 220. Reliable network engine 350 also receives and unwraps network packets from SAN 220 and passes the packet payload and other information to the I/O node PT engine 352.

Reliable network engines 334 and 350 are in communication with each other to ensure that packets are transmitted reliably between host node 210 and I/O node 230. Reliable network engines 334 and 350 perform standard network protocol functions, including acknowledging (ACKing) and NAKing receipt of packets, error detection, requesting retransmission of packets, etc.

Figure 5:
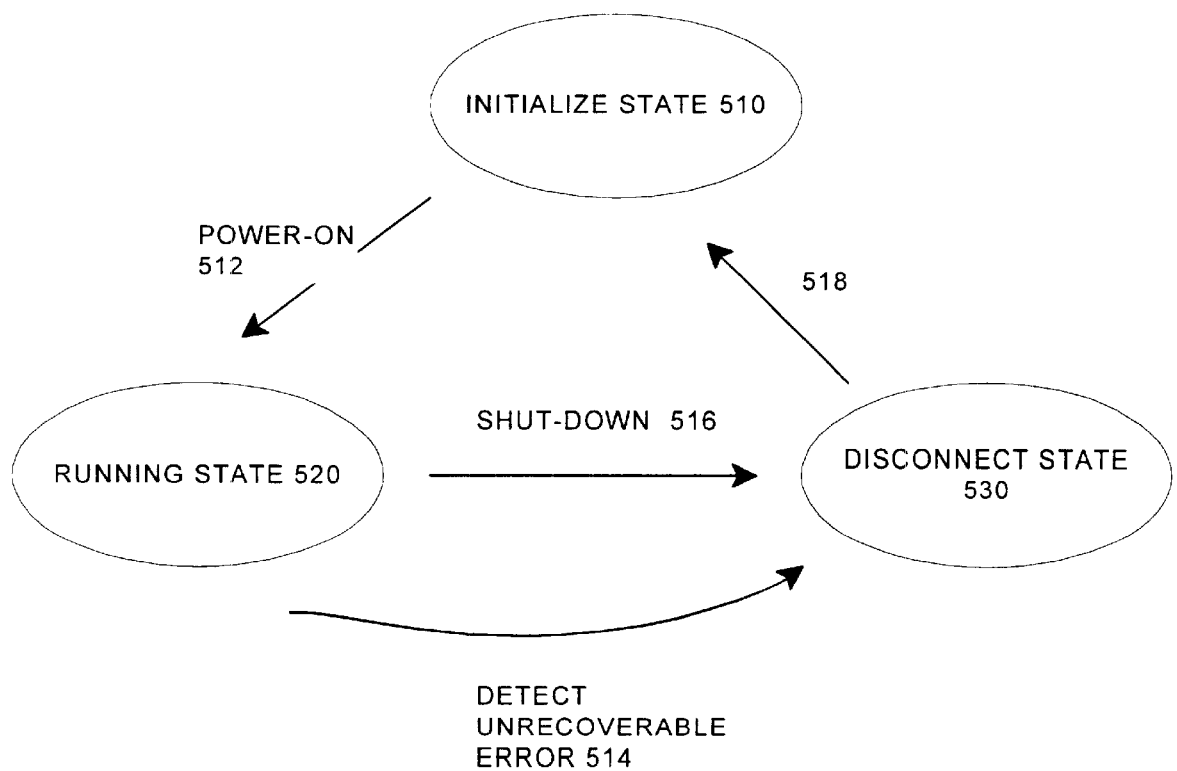
FIG. 5 illustrates a state table for nodes according to an embodiment of the present invention.

FIG. 5 illustrates a state table for nodes according to an embodiment of the present invention. The state table of FIG. 5 illustrates three possible states for each node (including host nodes 210 and 110 nodes 230), and the transitions between states. Initially, a node will normally exist in an initialized state 510. When a power-on initialization routine is executed, step 512, the node transitions to the running state 520 (which is the normal operating or running state for the node). The node transitions to a disconnected state 530 by either shutting down power at step 516 (voluntarily disconnecting from the SAN 220) or by detecting an unrecoverable error at step 514 (where the node must disconnect from the SAN 220 due to a malfunction or error). When the problem or malfunction in the node has been remedied or replaced, step 518, the node enters the initialized state 510 (which operates as a standby state), until a power-on initialization routine is executed, step 512. The states and transitions (steps) shown in FIG. 5 describe the operation of both the host nodes 210 and I/O nodes 230.

The operation of the host PT engine 332 and the I/O node PT engine 352 will now be briefly described.

Figure 4:
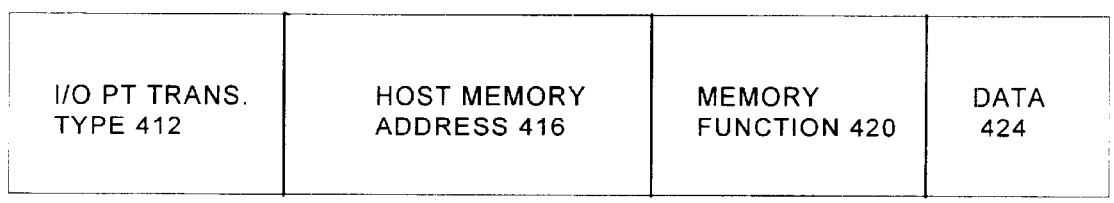
FIG. 4 illustrates an example of a packet payload according to an embodiment of the present invention.

Based on a host transaction received from system chipset 314, the host PT engine 332 creates an appropriate packet payload (to be sent in a packet over SAN 220). FIG. 4 illustrates an example of a packet payload created by the host PT engine 332 according to an embodiment of the present invention. (Packet payload 410 is also provided by engine 334 to host PT engine 332 for incoming packets). The packet payload 410 includes several fields, including an I/O pass-through (PT) transaction type 412 identifying the type of pass-through transaction, the host memory address 416 for the transaction, the memory function 420 and the data 424 to be written or stored in the I/O device (e.g., for write transactions). Other fields can be included.

The data provided in field 424 (e.g., for a write operation) corresponds to the data provided in one or more host memory transactions. Likewise the host memory address field 416 is the same address output by CPU 310 as part of the host memory transaction. The memory function 420 indicates the memory function being requested by the host CPU 310. The memory function 420 can include, for example, read cache line, write cache line, read word, write word, read I/O, write I/O, etc. For example, the memory functions that can be provided in field 420 can include the standard functions or commands known or used in the art.

There are several different types of pass-through transactions specified by I/O PT transaction type field 412, including read, write, control and broadcast transactions. Host PT engine 332 specifies one of the I/O PT transaction types in field 412 based on the state of the (host) node (initialized, running or disconnected) and the memory function indicated by field 420. In the initialized state 510 and the disconnected state 520, the node broadcasts (i.e., sends to all nodes connected to SAN 220) one or more messages. In the initialized state 520, during power-on initialization, step 512, the node can broadcast query packets to all nodes asking all connected nodes to respond with packets, for example, identifying themselves and providing their network addresses, device identification/configurations, and their node memory maps, etc. This information is used by the receiving host node during initialization (step 512, FIG. 5) to create a memory map, such as a system memory map (created by the host node 210) or a local I/O memory map (created by the I/O node 230). Also, while in a running state 520 and in response to an error, step 514, or prior to node shut-down, step 516 (as examples), a node can broadcast a packet indicating that the node is disconnecting from the SAN 220. In response to such a disconnect packet, other nodes will remove the disconnecting node from their memory maps. Broadcast packets are sent to all nodes, and therefore, no destination network address is required.

The remaining I/O PT transaction types (read, write, control) can be specified for field 412 by the host PT engine 332 based on the memory function when the node is in a running (or operational) state 520. These types of packets are point-to-point (e.g., directed to a particular network address destination). Read and write transaction types are specified for field 412 whenever a read or write memory function is requested by the host CPU, respectively (e.g., used for memory functions of read or write cache line, I/O read or write, etc.). A control packet can be specified and output (by the PT engine 332 specifying "control" for field 412) whenever a node is sending a special control packet to a particular destination node. An example of a control packet may be to ACK or NAK the completion of a requested function or transaction if a piggy-back was not available for the ACK or NAK.

The I/O PT transaction type (field 412) is provided at the beginning of packet payload so that the reliable network engine 334 need only examine this first field to determine the type of transaction. Based on the type of transaction, reliable network engine 334 then creates the appropriate network packet (e.g., includes data for a write or control transaction, and no network address is provided for a broadcast transaction).

Next, the host PT engine 332 identifies the appropriate network address of the destination I/O node 230 using a system memory map, as described in greater detail below. Then the host PT engine 332 passes the packet payload 410 and the network address of the destination I/O node 230 to the reliable network engine 334. The reliable network engine 334 then wraps the packet payload in an appropriate network packet for transmission over the SAN 220 to the destination I/O node 230. The reliable network engine 334 appends the appropriate network header(s) to the packet payload 410, which will typically include at least the network address of the destination I/O node 230 to ensure that the packet is delivered to the proper destination, as well as the source network address (i.e., the network address of the host node 210).

In a similar fashion, for inbound transactions, the reliable network engine 334 receives a network packet from a remote I/O node 230 via SAN 220. The reliable network engine 332 strips off the network header(s) and passes the packet payload and the network address of the source I/O node 230 (obtained from the network header) to the host PT engine 332. Host PT engine 332 generates the appropriate host memory transaction based on the fields in the packet payload 410 of the received packet. The created host transaction is provided to the system chipset 314 (including the memory and I/O controller) via line 330 so that the specified host memory transaction can be executed. If it is a read transaction, the requested data is obtained from memory 316, placed in an appropriate packet payload 410 by host PT engine 332 and then wrapped in a network packet by the reliable network engine 334 for transmission back to the requesting I/O node 230 via SAN 220.

At the I/O node 230, network packets are received via SAN 220 by the reliable network engine 350. Reliable network engine 350 provides the source network address (i.e., the network address of the host node 210 that sent the packet) and the packet payload 410 to the I/O node PT engine 352. I/O node PT engine 352 operates similarly to a host-to-PCI bridge because I/O node PT engine 352 converts host transactions (provided in a packet payload 410) to a corresponding PCI transaction for replay over PCI bus 357. I/O node PT engine 352 also converts PCI transactions received from a PCI device 360 via PCI bus 357 to a corresponding host transaction. The converted host transaction is then wrapped in a network packet by reliable network engine 350 and reliably transmitted to a host node 210 via SAN 220 for replay as the corresponding host transaction.

Some details of device configuration and initialization of the system architecture illustrated in FIG. 3 according to an embodiment of the present invention will now be described in greater detail. At power-up initialization of a host node 210, host PT engine 332 determines what I/O nodes and I/O devices are connected to the SAN 220 (e.g., using one or more broadcast packets), and then generates a system memory map. Details of this process are described below.

According to an embodiment of the present invention (see FIG. 2), one or more host nodes 210 are connected to a plurality of I/O nodes 230. With respect to each host node 210, each I/O node 230 is mapped to a specific predetermined range within the address range of the host CPU 310. According to an embodiment of the present invention, the host memory address ranges for each of the possible I/O nodes 230 are in hardware or firmware of host node 210 and are provided to the host CPU 310 at power-up initialization. Alternatively, as described in greater detail below, the memory address ranges are provided to host node 210 during initialization in response to one or more broadcast query packets. The host memory address ranges mapped for each I/O node 230 may be different for different host nodes.

Before a host node 210 can generate a system memory map, the host node 210 must first determine which I/O nodes or devices are connected to SAN 220. There are several ways in which host PT engine 332 can determine what I/O nodes or devices are connected to host node 210 via SAN 220. According to an embodiment of the present invention, at power-up initialization of host node 210, host PT engine 332 broadcasts a query packet to all nodes connected on the SAN 220. Each I/O node responds to the query packet with a reply packet that includes a memory map for that I/O node (e.g., PCI configuration space information for the I/O node PT engine 352 and all PCI devices 360 connected thereto). Each reply packet will include the network address of the I/O node 230 in the source field (of a network header appended to the payload by the reliable network engine 350). Based on the PCI configuration space information and the network address for each I/O node 230 (e.g., network address for an I/O node PT engine 352), the host PT engine 332 generates and stores in memory a system memory map that identifies, for each I/O node 210 connected to the SAN 220, the network address of the I/O node 230 (i.e., the network address of the I/O PT engine of the I/O node) and the corresponding mapped host memory address region (for that I/O node). The system memory map can be stored, for example, in a dedicated memory (e.g., dedicated RAM or Cache on or adjacent to the host PT engine 332), or in a portion of main memory 316 specifically allocated to the host PT engine 332 for that purpose.

Thus, according to an embodiment of the present invention, the I/O nodes 230 are intelligent and control the generation of the system address map (e.g., the I/O nodes are masters and the host nodes are slaves). In contrast, in prior art bridges and computer systems, the host node controlled the generation of the memory maps (e.g., the host nodes were masters and the I/O nodes were slaves with respect to address memory maps).

Instead of broadcasting a query packet to all devices connected to the SAN 220, any host node 210 powering-up can be notified (via one or more control packets) of the network address of the SAN master or administrator storing the system map for the SAN 220. The host node 210 can then obtain the system map from the SAN master or administrator. From the above discussion, it should be understood by those skilled in the art that there are other ways in which each host node 210 can determine what devices are connected to the SAN 220 and the memory address range and network address for each I/O node connected to the SAN 220.

In addition, during system initialization, each I/O node 230 (i.e., each I/O node PT engine 352) generates a local I/O memory map that identifies a PCI address range corresponding to a host memory address range and the network address of the host node. If there is only one host node 210 connected via SAN 220 to the I/O node 230, then the host memory address can map directly (one-to-one) to the PCI address. This means that when there is only one host node 210, the PCI address can be the same as the host memory address (but these are not necessarily the same).

However, when there is more than one host node 210 connected via SAN 220 to an I/O node 230, there are two possible implementations, according to embodiments of the present invention. In a first embodiment, a single I/O node 230 (a single I/O resource) is shared among multiple host nodes 210. In a second embodiment of the present invention, a single I/O node 230 includes different I/O devices connected thereto, and different I/O devices of the single I/O node are accessed separately by the different host nodes 210. These two embodiments are briefly described below.

According to the shared embodiment, such as in a clustered environment, multiple host nodes can share a single I/O node 230 by mapping the host memory address ranges for both host nodes to the same I/O address range. By way of example, the I/O node PT engine 352 will generate and store two local I/O memory maps, one local I/O memory map associated with host node 210A (a first host node), and a second local memory map associated with host node 210B (a second host node). Both local I/O memory maps will identify the host memory address ranges, the network address of the respective hosts and the corresponding (local) PCI address ranges. However, in this shared resource case, because the two host nodes (host nodes 210A and 210B) are sharing the same I/O resource (e.g., the two host nodes 210A and 210B share the same I/O node PT engine and associated PCI devices 360), both local I/O memory maps will map to the same PCI address range (even though the two host memory address ranges may or may not be the same). However, in this case where a common I/O resource is shared among multiple host nodes, the host nodes must usually control and coordinate access to each I/O device and manage data coherency among themselves. For example, resource locks can be used to provide exclusive access to the shared resource.

According to the other embodiment of the present invention, a single I/O node 230 is accessed by different host nodes, but different I/O devices (e.g., different PCI devices) within the single (physical) I/O node are separately assigned by I/O PT engine 352 to be accessed by different host nodes 210A and 210B. In this case, (as above) the local I/O memory maps will also identify the host memory address ranges and the network address of the respective hosts and the corresponding (local) PCI address ranges. However, in this separate case, the local I/O memory maps generated by an I/O node (by an I/O node PT engine 352) will map to different PCI address ranges (even though the host memory address ranges may be the same). The different PCI address ranges (for the local I/O memory maps) indicate that different PCI devices 360 can be accessed by each host node 210 (e.g., PCI device 360A can be accessed by host node 210A, and PCI device 360B can be accessed by host node 210B). When an I/O node is programmed to operate as a separate I/O system for each host node, each I/O node PT engine 352 generates a local I/O memory map mapping the host address range to a PCI address range that is unique or specific to that host node. In such case, query packets are identified as being from different host nodes based on the different network addresses in the source field of the query packets. Based on this network address information, an I/O node PT engine 352 generates a local I/O memory map corresponding to each connected host node. Each local I/O memory map will map the host memory addresses to a different PCI address range (i.e., to a different PCI device 360). The I/O node 230 uses different local I/O memory maps for different host nodes. As an example, an I/O node 230 uses a first local I/O memory map to convert addresses for packets received from a first host node 210, and uses a second local I/O memory map for packets received from a second host node. This is because the memory mappings may be different for each host node 210.

Figure 6:
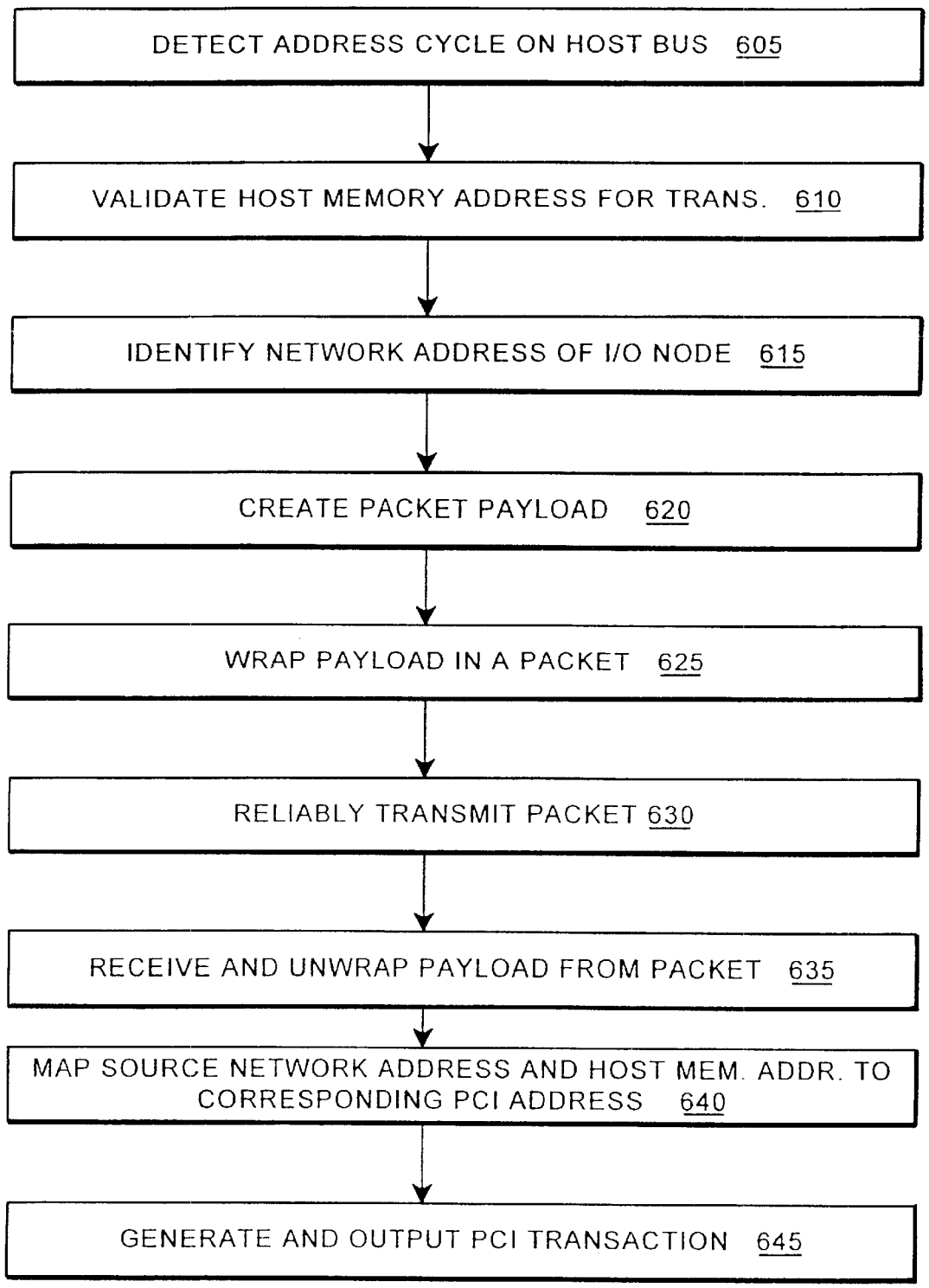
FIG. 6 illustrates a flow chart describing the flow for a host node to I/O node transaction according to an embodiment of the present invention.

FIG. 6 illustrates a flow chart describing the flow for a host node 210 to I/O node 230 transaction (e.g., outbound transaction) according to an embodiment of the present invention. The operation described by FIGS. 6 and 7 (also described below) both assume that a system memory map and one or more local I/O memory maps have been generated during power-up initialization (or at some other time) as described above. Each host PT engine 332 is assigned a predetermined address range.

Referring to FIG. 6, step 605, the host PT engine 332 (FIG. 3) detects an address cycle (generated by the host CPU 310) on the system bus and determines if the address is directed to the address range of host PT engine 332.

At step 610, the host PT engine 332 validates the host memory address (accepts the transaction) because the transaction address is directed to the address range assigned to the host PT engine 332. Otherwise, the transaction is directed to another memory address or location (e.g., address is directed to another bridge or to main memory 316) and is ignored by host PT engine 332.

At step 615, the host PT engine 332 identifies the network address of the I/O node 230 corresponding to the host memory address (of the validated host transaction) using the system memory map. As described above, the system memory map maps a host memory address range to a network address of the corresponding I/O node.

At step 620, the host PT engine 332 creates the packet payload 410 based on the host transaction, including the I/O PT transaction type 412, the host memory address 416, the memory functions 420 (e.g., read or write) and the data 424 (if required).

At step 625, the reliable network engine 334 receives the packet payload and the network address of the destination I/O node from the host PT engine 332, and wraps the packet payload in a network packet (including the appropriate network header(s) appended to the payload). The network header may include the network address of the host node 210 (as a source address) and the network address of the destination I/O node 230 (as a destination address). The host PT engine stores in memory its own network address, and identified the network address of the I/O node 230 corresponding to the host memory address in step 615.

To improve efficiency of the system, the host PT engine 332 can analyze addresses provided on the system bus for subsequent address cycles to determine if there is a block of contiguous data that is being moved (indicated by addresses provided on the system bus having sequential addresses and with the same transaction type). If so, the host PT engine 332 can continue to buffer data for each address cycle until the data field 424 of the packet payload becomes full. This is just one way to optimize the methods of the present invention.

At step 630, the network packet is reliably transmitted over the SAN 220 (which may include one or more switches) to the I/O node 230 designated by the destination network address.

At step 635, the reliable network engine 350 receives the packet (and may wait to receive all the data for this transaction), and unwraps the packet by stripping off any network headers to obtain the packet payload. The payload and the network address of the source host node 210 are provided to the I/O node PT engine 352.

At step 637, the I/O node PT engine 352 receives the packet payload and source address. The I/O node PT engine examines the I/O PT transaction type field 412. If the field 412 designates a type of write transaction (e.g., write or configure or control), then the I/O node PT engine immediately instructs the reliable network engine 350 to return an ACK to the host node (either as an ACK packet or piggy-backed on another packet being sent to the host node 210), even though the write operation has not yet been performed. The host node 210 receives the ACK packet and releases the transaction (e.g., the host CPU 310 can proceed with processing other items without waiting for the transaction to actually be completed). Alternatively, the ACK packet can be sent to the host node 210 after the write operation is completed on the I/O device 360.

At step 640, the I/O node PT engine 352 maps the source network address (identifying the network address of the host node 210) and the host memory address 416 in the payload 410 for the transaction to an appropriate PCI address (local PCI 25 address).

In the case where there is only one host node 210 that can access or communicate with I/O node 230, the PCI address should map one-to-one with the host memory address, and thus, the PCI address can be the same as the memory address (generated by the host).

However, in the case where there are multiple host nodes 210 that can access the I/O node 230, then the I/O node PT engine 352 first identifies the local I/O memory map corresponding to the host node 210 (e.g., corresponding to the network address of the host node 210 that sent the packet). The I/O node PT engine 352 then maps the host memory address provided in the payload 410 to a corresponding PCI address using the identified local I/O memory map.

At step 645, the I/O node PT engine 352 generates and outputs one or more PCI transactions onto the PCI bus 357 corresponding to the memory function (e.g., specifying either a read or write transaction) in the memory function field 420 in the payload 410, and using the data in the data field 424 (only for a write operation), and using the corresponding PCI address identified using the local I/O memory map. If the data provided in the data packet of the network packet is larger than that which can be output in a single PCI transaction, then the received data will be broken into multiple chunks and provided over PCI bus 357 using multiple PCI transactions.

In the event of a read transaction (e.g., a host read to a PCI device), the requested data is obtained by the I/O node PT engine 352. The requested data may be buffered from a plurality of PCI transactions if necessary. The requested data, the corresponding host memory address and the network address of the host node 210 requesting the data are provided to the reliable network engine 350 so that a network reply packet may be assembled and transmitted via the SAN 220 to the host node 210.

According to an embodiment of the present invention, the host memory addresses and the PCI addresses generated at the host node and in the system memory map and local I/O memory maps should be cache line aligned. For example, if one cache line is 32 bytes, then addresses for host and PCI transactions should be in increments of 32 bytes, beginning from address zero.

Figure 7:
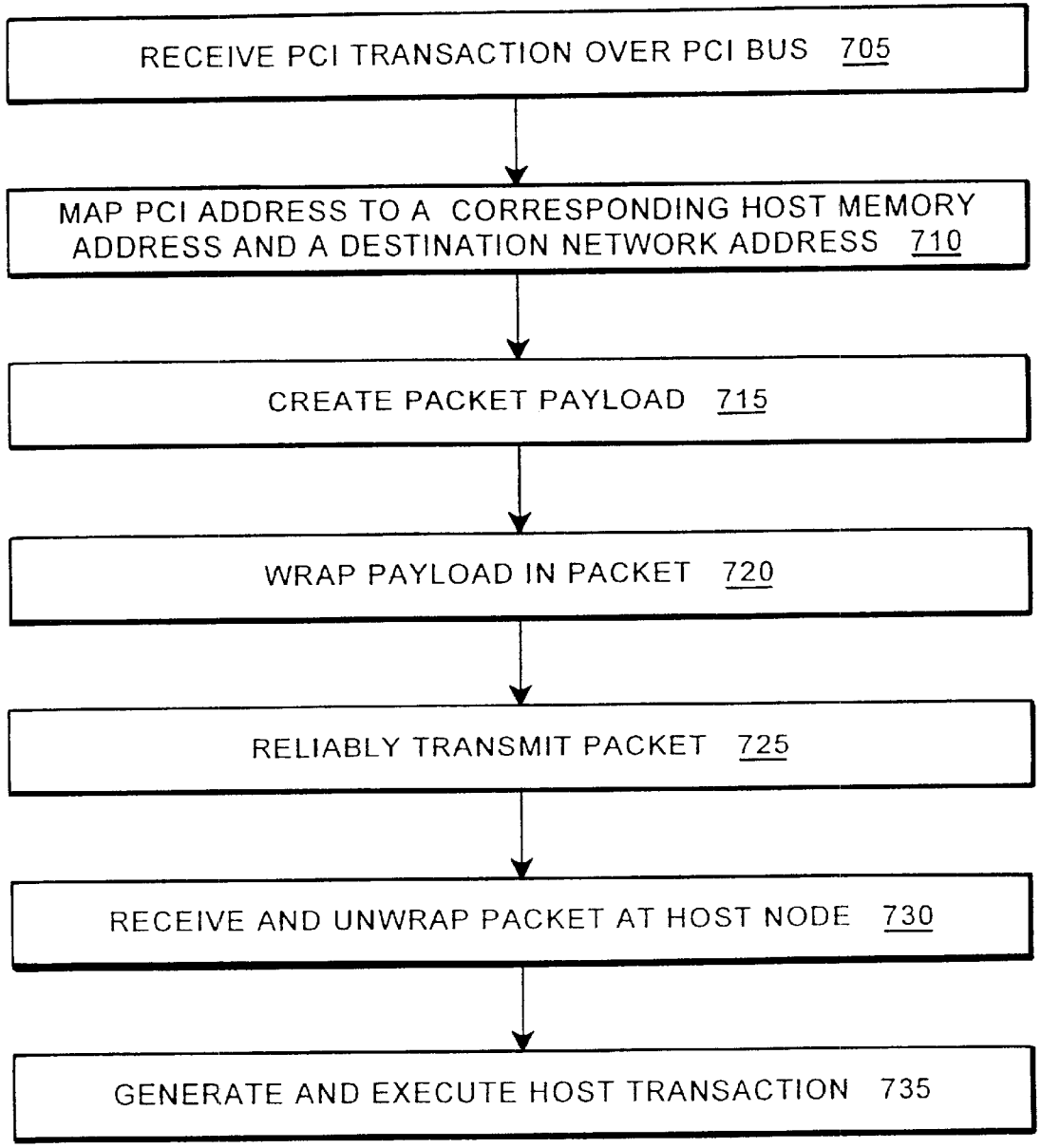
FIG. 7 illustrates a flow chart describing the flow for an I/O node to host node transaction according to an embodiment of the present invention.

FIG. 7 illustrates a flow chart describing the flow for a I/O node to host transaction according to an embodiment of the present invention.

At step 705, the I/O PT engine 352 receives a PCI transaction (PCI address and data, etc.) from a PCI device 360 over PCI bus 357. The I/O node PT engine examines the PCI address and accepts the PCI transaction if the PCI address is within the range assigned to the I/O PT engine 352.

At step 710, based on the PCI address, the I/O PT engine 352 maps the PCI address of the transaction to a specific network address (identifying the target host node 210) and the corresponding host memory address using one of the local I/O memory maps. In the simple case, similar to that described for FIG. 5, there is only one host node which can access the I/O node, and thus, the PCI address can be mapped one-to-one to the host memory address, and may even be the same address. However, where more than host node 210 can access each I/O node 230, one of the local I/O memory maps must be selected (based on the PCI address) and used to identify a corresponding network address and host memory address.

According to an embodiment of the present invention, each Device ID (of each PCI device 360) maps to only one of the host nodes 210, and the Device IDs are provided in the corresponding local I/O memory map. Thus, in one embodiment of the present invention, each local I/O memory map also includes the corresponding Device IDs, and one of the local I/O memory maps can be selected (corresponding to one of the host nodes) based on the Device ID provided in the PCI transaction (because each Device ID is mapped to only one host node).

At step 715, the I/O node PT engine 352 creates a packet payload that includes the data (for a write transaction), the corresponding host memory address (obtained from the local I/O memory map), the memory function (read or write) based on the PCI transaction. The network address of the target host node is provided with the packet payload to the reliable network engine.

At step 720, the reliable network engine 350 wraps the payload in one or more network packets. The packet includes one or more network headers (including source and destination network addresses).

At step 725, the NG I/O packet is transmitted to the target host node 210 via the SAN 220.

At step 730, the network packet is reliably received by the reliable network engine 334. The packet is unwrapped by stripping away the network headers to obtain the packet payload. The packet payload and the source address (network address of the I/O node 230) are provided to the host PT engine 332. If the transaction is a write, an ACK packet is sent back to the I/O node 230 (or an ACK may be sent after completion of the write).

At Step 735, a host memory transaction is generated and executed at the host node 210 based on the fields provided in the packet payload 410. If the transaction is a read, the requested data is obtained from memory, wrapped in a (reply) packet, and sent to the I/O node 230 via SAN 220.

According to an embodiment of the present invention, a plurality of I/O nodes 230 are located remotely from one or more host nodes 210. Host nodes 210 and I/O nodes 230 are interconnected via a system area network (SAN) 220. In this manner, more I/O devices can be connected to a CPU than presently permitted by bus loading limitations. Moreover, the present invention permits a distributed architecture in which I/O devices are removed from the cabinet or housing of the host node, and are remotely located. Moreover, the remotely located I/O devices 360 emulate the operation of a local PCI bus. The present invention allows I/O pass through transactions because the transactions are, in effect, passed through the network to be replayed at the destination point. In particular, according to an embodiment of the present invention, a transaction is wrapped in a packet, transmitted to the destination point, and then a local transaction (e.g., either a host transaction or a PCI transaction) is generated based on the received transaction data. In addition, one or more memory maps are used to assist in converting the transactions between host transactions and PCI transactions.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of remotely executing a bus transaction comprising the steps of:

detecting a bus transaction on a first bus located at a first node;

identifying, based on the memory address of the bus transaction, that the first bus transaction is directed to a second node that is remotely located from the first node;

wrapping the first bus transaction in a packet for transmission over a network;

transmitting the packet over the network to the second node;

unwrapping the first bus transaction from the packet received at the second node;

converting the first bus transaction to a second bus transaction that can be executed on a second bus located at the second node;

outputting the converted second bus transaction onto the second bus to be executed;

generating a memory map that maps a first bus address of the first bus transactions to a corresponding second bus address for the second bus transaction.

2. The method of claim 1 wherein said step of converting the first bus transaction to a second bus transaction that can be executed on a second bus comprises at least the step of converting a first bus address of the first transaction to a corresponding second bus address using the memory map.

3. A distributed computer system comprising:

a host node, said host node programmed to perform the following steps:

receive a host memory transaction;

validate that the host memory transaction is directed to a remotely located I/O node;

wrap the host transaction in a network packet; and reliably transmit the network packet over a network to the I/O node; and an I/O node that is remotely located from the host node, the I/O node including one or more I/O buses, said I/O node programmed to perform the following steps:

receive the network packet from the host node;

unwrap the host transaction from the packet;

convert the host transaction to a corresponding I/O transaction;

output the converted I/O transaction onto an I/O bus for execution;

wherein said host node comprises:

a host CPU coupled to a host bus;

main memory coupled to the host bus;

a host pass-through engine coupled to the host bus, the host pass-through engine programmed to perform the following steps:

a) generating a system memory map that maps host memory addresses to a network address;

b) receiving a host transaction, including a host memory address, optional data and the transaction type;

c) identifying a network address of a destination I/O node corresponding to the host memory address based on the system memory map; and d) creating a packet payload including the host memory address, optional data and transaction type of the host transaction;

a host-side reliable network engine coupled to the host pass-through engine for receiving the packet payload and the network address of the destination I/O node from the host pass-through engine, said host reliable network engine wrapping the payload in a network packet for reliable transmission over a network, the packet including a network address of the host node as the source of the packet and the network address of the I/O node as the destination.

4. The distributed computer system of claim 3 wherein said I/O node comprises:

an I/O-side reliable network engine coupled to a network for reliably receiving and unwrapping the network packet to obtain the source network address and the packet payload;

an I/O bus;

an I/O device coupled to the I/O bus; and an I/O node pass-through engine coupled to the I/O-side reliable network engine and the I/O bus, said I/O node pass-through engine programmed to perform the following:

a) generating a local I/O memory map corresponding to the network address of the host node that maps each host memory address of the host node to a corresponding I/O address at the I/O node;

b) receiving the packet payload and the source network address from the I/O-side reliable network engine;

c) generating an I/O transaction based on the received payload, including converting the host memory address and source network address of the host node to a corresponding I/O address using the local I/O memory map; and d) outputting the I/O transaction, including the converted I/O address, onto the I/O bus for execution by the I/O device.

5. A distributed computer system comprising:

a host node comprising:

a host CPU coupled to a host bus;

main memory coupled to the host bus;

a host pass-through engine coupled to the host bus and a system area network, the host pass-through engine programmed to perform the following:

a) generating a system memory map that maps host memory addresses to a network address;

b) receiving a host transaction, including a host memory address, optional data and the transaction type;

c) identifying a network address of a destination I/O node corresponding to the host memory address based on the system memory map; and d) creating a packet payload for transmission in a network packet over the system area network, the payload including the host memory address, optional data and transaction type of the host transaction; and an I/O node coupled to the host node via the system area network, the I/O node comprising:

an I/O bus;

an I/O device coupled to the I/O bus; and an I/O node pass-through engine coupled to the system area network and the I/O bus, said I/O node pass-through engine programmed to perform the following:

a) generating a local I/O memory map corresponding to the network address of the host node that maps each host memory address of the host node to a corresponding I/O address at the I/O node;

b) receiving the packet payload and the source network address in a packet received over the system area network;

c) generating an I/O transaction based on the received payload, including converting the host memory address and source network address of the host node to a corresponding I/O address using the local I/O memory map; and d) outputting the I/O transaction, including the converted I/O address, onto the I/O bus for execution by the I/O device.

6. A distributed computer system comprising:

a host node comprising:

a host node pass through engine receiving a host transaction and validating that the host transaction is directed to a remotely located I/O node;

a host node network engine coupled to the host node pass through engine and to a system area network, the host node network engine wrapping the host transaction in a network packet and transmitting the network packet over the system area network;

an I/O node that is remotely located from the host node, the I/O node comprising:

an I/O node network engine coupled to the system area network and receiving the network packet from the host node and unwrapping the host transaction from the packet;

an I/O node pass through engine coupled to the I/O node network engine and an I/O bus, the I/O node pass through engine converting the host transaction to a corresponding I/O transaction and outputting the I/O transaction onto the I/O bus for execution.

\* \* \* \* \*